United States Patent
Sasaki et al.

(10) Patent No.: US 10,244,573 B2
(45) Date of Patent: Mar. 26, 2019

(54) WIRELESS COMMUNICATION DEVICE, WIRELESS COMMUNICATION METHOD AND PROGRAM

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Masao Sasaki, Okazaki (JP); Hirokazu Ishida, Nagoya (JP); Kazushige Hayashi, Toyota (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 56 days.

(21) Appl. No.: 15/515,023

(22) PCT Filed: Sep. 8, 2015

(86) PCT No.: PCT/JP2015/075395
§ 371 (c)(1),
(2) Date: Mar. 28, 2017

(87) PCT Pub. No.: WO2016/067757
PCT Pub. Date: May 6, 2016

(65) Prior Publication Data
US 2017/0208642 A1    Jul. 20, 2017

(30) Foreign Application Priority Data
Oct. 29, 2014  (JP) ................................ 2014-220229

(51) Int. Cl.
*H04W 4/80* (2018.01)
*H04W 8/00* (2009.01)
(Continued)

(52) U.S. Cl.
CPC ............. *H04W 76/14* (2018.02); *H04W 4/04* (2013.01); *H04W 8/00* (2013.01); *H04W 8/005* (2013.01);
(Continued)

(58) Field of Classification Search
CPC ....... H04W 36/365; H04W 4/04; H04W 4/80; H04W 76/14; H04W 84/10; H04W 84/12; H04W 88/06; H04W 8/00; H04W 8/005
See application file for complete search history.

(56) References Cited

U.S. PATENT DOCUMENTS

| | | |
|---|---|---|
| 6,895,255 B1 | 5/2005 | Bridgelall |
| 7,257,099 B2 | 8/2007 | Myojo |

(Continued)

FOREIGN PATENT DOCUMENTS

| | | |
|---|---|---|
| JP | 2002319948 A | 10/2002 |
| JP | 2003199160 A | 7/2003 |

(Continued)

OTHER PUBLICATIONS

Jun. 9, 2017 Search Report issued in European Patent Application No. 15854030.2.

*Primary Examiner* — Kashif Siddiqui
(74) *Attorney, Agent, or Firm* — Oliff PLC

(57) ABSTRACT

Wireless communication devices, systems, and programs perform, via a single antenna: (i) communications in a first wireless communication mode in which processing of searching for other registered devices is repeatedly executed at a predetermined execution interval in order to connect to these other devices, the execution interval being set to a reference interval; and (ii) communications in a second wireless communication mode according to a communication standard other than the first wireless communication mode. The devices, methods, and programs change the (Continued)

execution interval in the first wireless communication mode to a value larger than the reference interval during at least a part of a period during which communication in the second wireless communication mode is being performed or communication in the second wireless communication mode is enabled.

9 Claims, 7 Drawing Sheets

(51) Int. Cl.
    *H04W 36/36*     (2009.01)
    *H04W 76/14*     (2018.01)
    *H04W 84/10*     (2009.01)
    *H04W 84/12*     (2009.01)
    *H04W 88/06*     (2009.01)
    *H04W 4/04*     (2009.01)

(52) U.S. Cl.
    CPC ......... *H04W 36/365* (2013.01); *H04W 84/10* (2013.01); *H04W 84/12* (2013.01); *H04W 88/06* (2013.01); *H04W 4/80* (2018.02)

(56) References Cited

U.S. PATENT DOCUMENTS

| | | |
|---|---|---|
| 8,340,716 B2 | 12/2012 | Sekiya et al. |
| 9,538,459 B1* | 1/2017 | Shirriff ................ H04W 48/16 |
| 2005/0170776 A1 | 8/2005 | Siorpaes |
| 2006/0221926 A1 | 10/2006 | Maekawa et al. |
| 2007/0275746 A1 | 11/2007 | Bitran |
| 2008/0279137 A1 | 11/2008 | Pernu et al. |
| 2009/0296652 A1* | 12/2009 | Rudowicz ............. H04W 48/16 |
| | | 370/331 |
| 2010/0118848 A1 | 5/2010 | Satou |
| 2013/0010766 A1* | 1/2013 | Sadek ............... H04W 72/1215 |
| | | 370/336 |
| 2016/0119971 A1* | 4/2016 | Bachu .................. H04W 16/14 |
| | | 370/328 |
| 2016/0219440 A1* | 7/2016 | Wang .................... H04W 24/02 |

FOREIGN PATENT DOCUMENTS

| | | |
|---|---|---|
| JP | 2004363728 A | 12/2004 |
| JP | 2005-045368 A | 2/2005 |
| JP | 2005045330 A | 2/2005 |
| JP | 2005529549 A | 9/2005 |
| JP | 2006-295869 A | 10/2006 |
| JP | 2009005195 A | 1/2009 |
| JP | 2009206848 A | 9/2009 |
| JP | 2011009948 A | 1/2011 |
| JP | 2011082679 A | 4/2011 |
| JP | 2012186522 A | 9/2012 |
| WO | 2008/102434 A1 | 8/2008 |
| WO | 2013150647 A1 | 10/2013 |

* cited by examiner

FIG. 6

|  | Wi-Fi STATUS | | | | | | |
|---|---|---|---|---|---|---|---|
|  | FUNCTION DISABLED | FUNCTION ENABLED (NOT CONNECTED) | AUTOMATIC CONNECTION PROCESSING | OBTAIN AP LIST | MANUAL CONNECTION PROCESSING | CONNECTED | ROAMING |
| EXAMPLE 1 | DISABLE LIMITATION | ENABLE LIMITATION | ENABLE LIMITATION | ENABLE LIMITATION | ENABLE LIMITATION | ENABLE LIMITATION | ENABLE LIMITATION |
| EXAMPLE 2 | DISABLE LIMITATION | DISABLE LIMITATION | DISABLE LIMITATION | DISABLE LIMITATION | DISABLE LIMITATION | ENABLE LIMITATION | DISABLE LIMITATION |
| EXAMPLE 3 | DISABLE LIMITATION | DISABLE LIMITATION | DISABLE LIMITATION | ENABLE LIMITATION | ENABLE LIMITATION | ENABLE LIMITATION | DISABLE LIMITATION |

WIRELESS COMMUNICATION DEVICE, WIRELESS COMMUNICATION METHOD AND PROGRAM

TECHNICAL FIELD

Related technical fields include wireless communication devices that perform communications in a plurality of wireless communication modes, and wireless communication methods and programs which are used to perform wireless communications by the wireless communication devices.

BACKGROUND

Conventionally, communication devices are known which include wireless communication means as means for communicating with other nearby devices or Internet communication networks. Recently, on-board devices such as navigation devices which include the wireless communication means have been proposed in addition to information terminals such as personal computers, mobile phones, smartphones, and tablets.

There is not just one kind of wireless communication mode. There are a plurality of kinds of wireless communication modes such as, e.g., a mode like Wi-Fi (registered trademark) in which communication is performed via an access point (base unit, base station, or station) and a mode like Bluetooth (registered trademark) in which communication is performed directly between devices without via an access point. Wireless communication devices have also been proposed which can perform communications in a plurality of kinds of wireless communication modes. For example, Japanese Patent Application Publication No. 2003-199160 (JP 2003-199160 A) proposes a wireless communication device that can perform communications in two kinds of wireless communication modes, namely a wireless LAN according to IEEE 802.11b and Bluetooth.

SUMMARY

However, configuring wireless communication devices so that they can perform communications in a plurality of kinds of wireless communication modes as in JP 2003-199160 A causes a new problem, namely interference between or among wireless communications, In particular, configuring wireless communication devices so that they perform communications in a plurality of kinds of wireless communication modes via a single antenna causes the following problem.

While the wireless communication device is performing communication in one of the wireless communication modes (hereinafter referred to as the "first wireless communication mode"), the antenna is occupied by the communication in the first wireless communication mode. Accordingly, even if the wireless communication device attempts to perform communication in the other wireless communication mode (hereinafter referred to as the "second wireless communication mode"), no radio wave is output from the antenna and the wireless communication device fails to perform the communication. This problem is significant particularly in the case where the first wireless communication mode is a wireless communication mode, such as Bluetooth (hereinafter referred to as "BT"), in which the wireless communication device repeatedly executes processing of searching for other registered devices at predetermined intervals in order to connect to these other registered devices.

FIG. 9 shows an example in which a wireless communication device is turned on (or a BT communication function is enabled) with five devices A to E being registered as target devices for BT communication. As shown in FIG. 9, the wireless communication device first executes search processing of searching for the registered device A in order to connect to the registered device A, The wireless communication device executes the search processing of searching for the registered device for up to 5.12 seconds until it can connect to the intended device. Subsequently, after a time interval of 1 second, the wireless communication device executes search processing of searching for the registered device B in order to connect to the registered device B. The wireless communication device similarly executes search processing of searching for the registered devices C to E at the above execution intervals. After executing the search processing of searching for all of the registered devices A to E, the wireless communication device similarly executes at the above execution intervals search processing of searching for any registered devices that failed to be connected.

Accordingly, if the wireless communication device cannot connect to all of the registered devices because their power is off, because they are not located nearby, etc., the wireless communication device continues to repeatedly execute the search processing. While the wireless communication device is repeatedly performing the search processing of searching for the registered devices, the antenna is occupied by BT communication for the duration of search processing, namely 5.12 seconds. Accordingly, even if the wireless communication device attempts to perform communication in the second wireless communication mode other than BT (e.g., Wi-Fi wireless LAN communication), it can perform the communication only when it is not executing the search processing, namely only during each execution interval of 1 second in the search processing, i.e., between the durations of 5.12 seconds. This causes problems with communication in the second wireless communication mode. For example, a connection fails to be established at a required timing, and even if a connection can be established, communication can be very slow or can be interrupted.

Exemplary embodiments of the broad inventive principles described herein were developed in order to solve the conventional problems and it is an object of exemplary embodiments to provide a wireless communication device, a wireless communication method, and a program in which even when communications in a plurality of kinds of wireless communication modes are performed via a single antenna, the communications in these wireless communication modes can coexist and the communications can be appropriately performed.

In order to achieve the above object, exemplary embodiments provide wireless communication devices, systems, and programs that perform, via a single antenna (i) communications in a first wireless communication mode in which processing of searching for other registered devices is repeatedly executed at a predetermined execution interval in order to connect to these other devices, the execution interval being set to a reference interval; and (ii) communications in a second wireless communication mode according to a communication standard other than the first wireless communication mode. The devices, methods, and programs change the execution interval in the first wireless communication mode to a value larger than the reference interval during at least a part of a period during which communication in the second wireless communication mode is being performed or communication in the second wireless communication mode is enabled.

According to the wireless communication device, the wireless communication method, and the program having the above configuration, the execution intervals of searching for other devices in the first wireless communication mode are changed according to the communication status in the second wireless communication mode. The antenna can thus be prevented from being occupied by the first wireless communication mode. This eliminates problems with communication in the second wireless communication mode such as failure to establish a connection at a required timing, and very slow communication and interrupted communication even if a connection can be established. That is, even when communications in a plurality of kinds of wireless communication modes are performed via a single antenna, the communications in these wireless communication modes can coexist and the communications can be appropriately performed.

BRIEF DESCRIPTION OF THE DRAWINGS

FIG. 6 is a table showing specific examples of conditions for limiting the execution intervals of search processing of searching for registered devices.

DETAILED DESCRIPTION OF EXEMPLARY EMBODIMENTS

Figure 1:
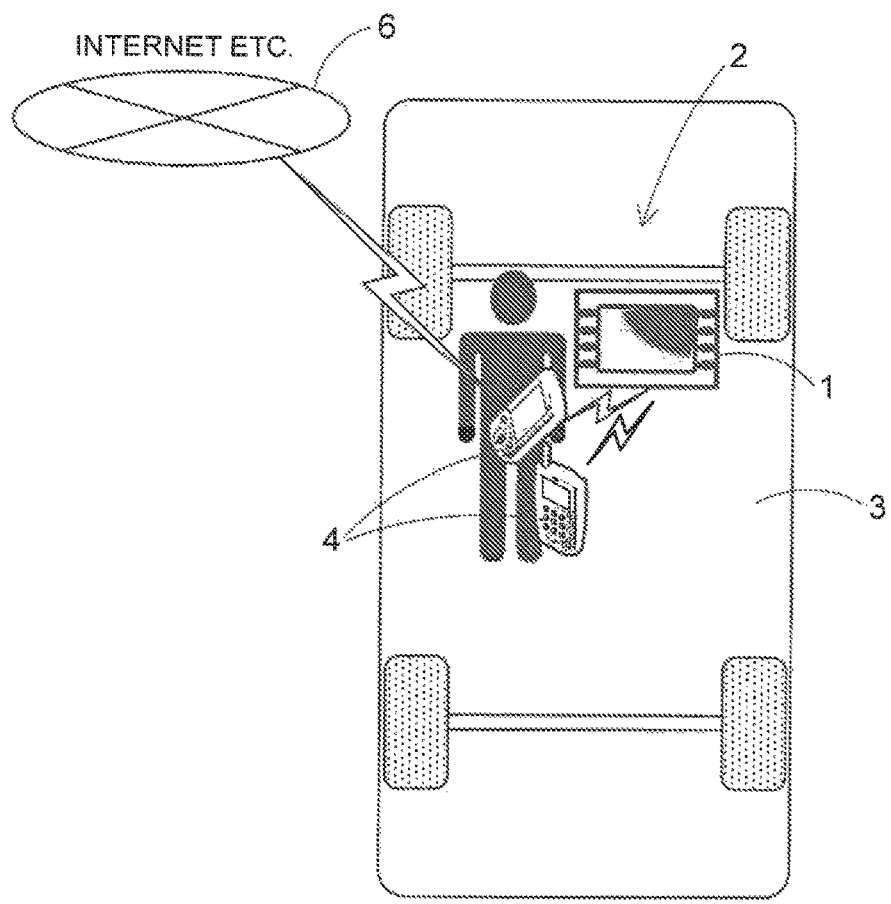
FIG. 1 is a schematic configuration diagram showing a wireless communication system according to an embodiment.

A wireless communication device will be described in detail below with respect to an embodiment of a navigation device 1 with reference to the accompanying drawings. First, a schematic configuration of a wireless communication system 2 including the navigation device 1 according to the present embodiment will be described with reference to FIG. 1. FIG. 1 is a schematic configuration diagram of the wireless communication system 2 according to the present embodiment.

As shown in FIG. 1, the wireless communication system 2 according to the present embodiment basically includes the navigation device 1 that is an on-board device mounted on a vehicle 3, and a mobile information terminal (mobile phone, smartphone, tablet), a router, a portable audio device, etc. (hereinafter referred to as the "target devices 4") which are possessed by an occupant (user) of the vehicle 3. The navigation device 1 and the target devices 4 are connected so that the navigation device 1 can communicate with the target devices 4 in a plurality of wireless communication modes, and are configured so that the navigation device 1 can transmit and receive data to and from the target devices 4. Any of the target devices 4 which is set as an access point, such as the router, is connected to an external server (e.g., a center that distributes map update information for updating map information, etc.) via a communication network 6 such as the Internet so that the target device 4 can communicate also with the external server.

Figure 2:
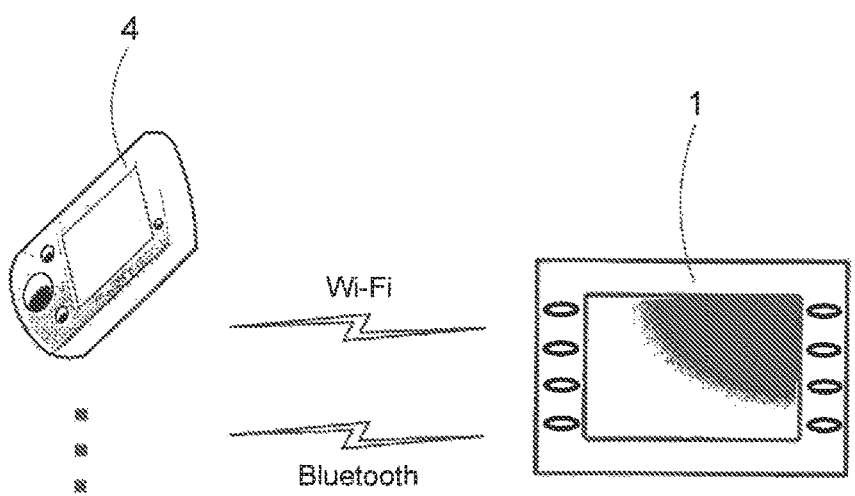
FIG. 2 is a diagram showing wireless communication modes of a navigation device according to the embodiment.

As shown in FIG. 2, the navigation device 1 according to the present embodiment communicates with the target devices 4 in two kinds of wireless communication modes, namely Wi-Fi (registered trademark) and Bluetooth (registered trademark). Wi-Fi is one of wireless LAN standards and is a wireless communication mode that allows devices to communicate with each other or connect to the Internet etc, via a device that is set as an access point (also called a base unit, a base station, or a station), Bluetooth (hereinafter referred to as "BT") is a wireless communication mode that allows devices to directly communicate with each other without via a device that is set as an access point. Wi-Fi uses a wider bandwidth for communication (i.e., faster communication) than BT. BT provides higher security than Wi-Fi because paired devices directly communicate with each other and the communication range is short, Moreover, BT communication is less susceptible to interference from other radio waves. Accordingly, it is preferable to transmit and receive large data (e.g. map update information for updating map information etc.) via Wi-Fi and to transmit and receive other data via BT as much as possible. In the present embodiment, Wi-Fi and BT are used as wireless communication modes. However, other wireless standards may be used instead of Wi-Fi. Other short-range wireless communications that do not use an access point may be used instead of BT.

Figure 3:
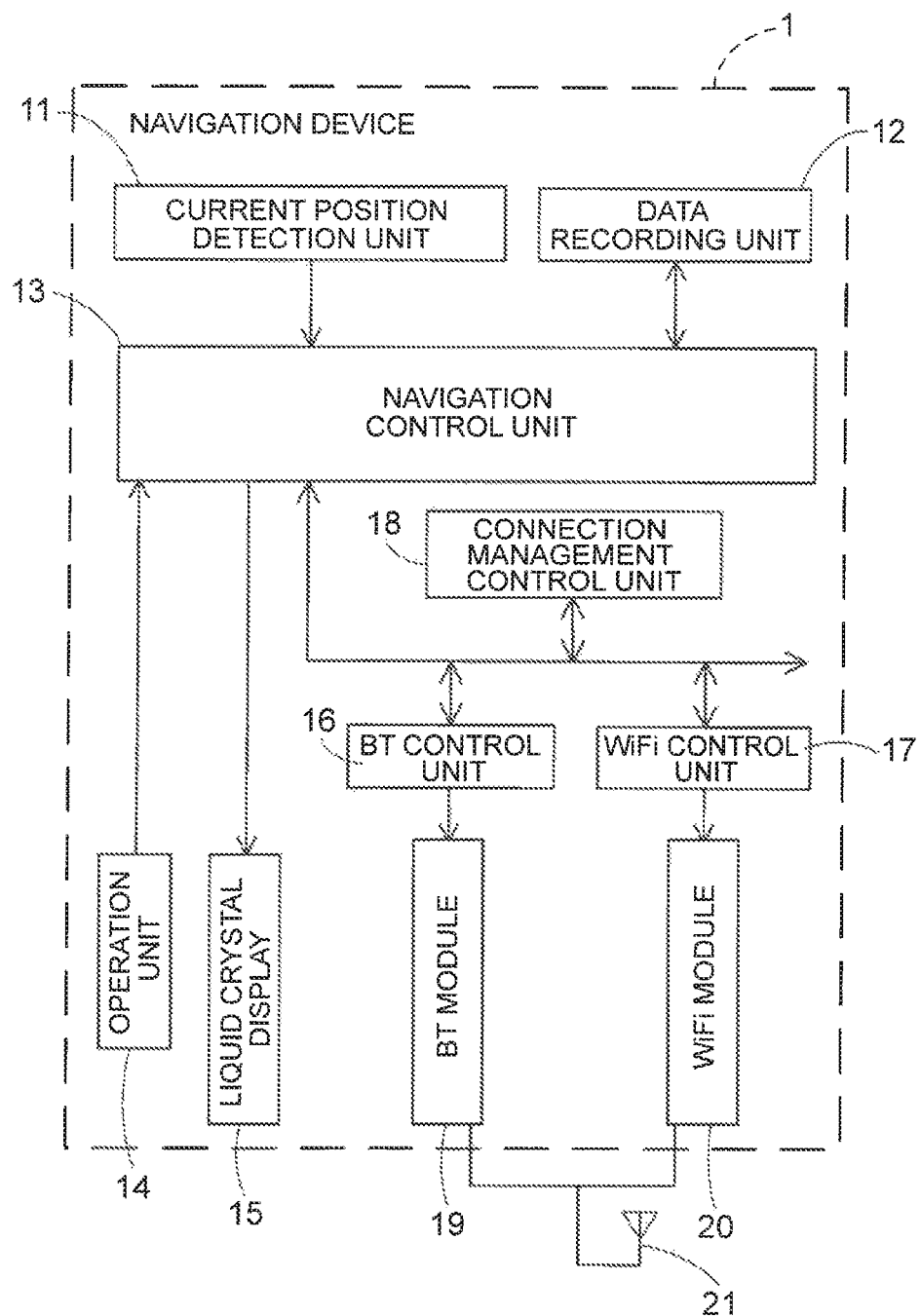
FIG. 3 is a block diagram showing the configuration of the navigation device according to the embodiment.

The navigation device 1 is an on-board device that has a function to identify the current position such a GPS and that displays a map of the area around the vehicle, displays the current position of the vehicle 3, and searches for a route to a set destination and guides the user to the destination based on stored map information. A schematic configuration of the navigation device 1 will be described with reference to FIG. 3. FIG. 3 is a block diagram showing the navigation device 1 according to the present embodiment.

As shown in FIG. 3, the navigation device 1 according to the present embodiment has: a current position detection unit 11 that detects the current position of the vehicle 3 equipped with the navigation device 1; a data recording unit 12 having various types of data recorded thereon; a navigation control unit 13 that controls the overall operation of the navigation device 1 such as route search and map image display; an operation unit 14 that accepts user's operations; a liquid crystal display (LCD) 15 that displays a map around the vehicle and information on facilities to the user; a BT control unit 16 that particularly controls operation regarding BT wireless communication of the navigation device 1; a WiFi control unit 17 that particularly controls operation regarding Wi-Fi wireless communication of the navigation device 1; a connection management control unit 18 that particularly manages connections of BT and Wi-Fi wireless communications; a BT module 19 that performs BT wireless communication; and a WiFi module 20 that performs Wi-Fi wireless communication.

The data recording unit 12 stores, in addition to map information, identification information (e.g. BT address, MAC address, SSID, etc.) required for Wi-Fi and BT communications.

The navigation control unit 13, the BT control unit 16, the WiFi control unit 17, and the connection management control unit 18 are electronic control units that perform various kinds of control on the navigation device 1. Each of these control units includes: a CPU or MPU that serves as an arithmetic device and a control device; a RAM that is used as a working memory when the CPU or MPU performs various calculations and that stores calculation data etc.; a ROM having recorded thereon a wireless communication setting program (see FIG. 4) and a BT device search program (see FIG. 7) which are described below, etc., in addition to a control program; and an internal storage medium such as a flash memory. (As used herein, the term "storage medium" is not intended to encompass transitory signals.) In particular, the BT control unit 16, the WiFi control unit 17, and the connection management control unit 18 have various means serving as processing algorithms. For example, execution interval changing means changes the BT execution intervals to a value larger than a reference interval during at least a part of a period during which Wi-Fi communication is being performed or Wi-Fi communication is enabled.

The operation unit 14 is operated when the user inputs a point of departure as a start point and a destination as an end point etc., and has a plurality of operation switches (not shown) such as various keys and buttons. Based on switch signals that are output in response to depression etc. of the switches, the navigation control unit 13 controls the navigation device 1 to perform various associated operations. Particularly in the present embodiment, the operation unit 14 is also operated when the user obtains a list of Wi-Fi access points, starts Wi-Fi or BT communication at a desired timing, enables or disables the Wi-Fi or BT communication function, etc. The operation unit 14 may have a touch panel provided on the front surface of the LCD 15. The operation unit 14 may have a microphone and a speech recognition device.

The LCD 15 displays a map image including roads, traffic information, operation guidance, an operation menu, a list of Wi-Fi access points, key guidance, a planned route from a point of departure to a destination, guidance information on the planned route, news, a weather forecast, time, emails, TV programs, etc. A HUD or a HMD may he used instead of the LCD 15.

The BT module 19 is a module for BT wireless communication. The navigation device 1 wirelessly communicates via BT module 19 with those target devices 4 which are located within a communication range by the BT. An antenna 21 that outputs radio waves in communication of the BT module 19 is the same as the antenna 21 that outputs radio waves in communication of the WiFi module 20 (i.e., Wi-Fi wireless communication and BT wireless communication are performed via the single antenna 21).

The WiFi module 20 is a module for Wi-Fi wireless communication. The navigation device 1 wirelessly communicates via Wi-Fi module 20 with the target devices 4 by the WiFi.

Figure 4:
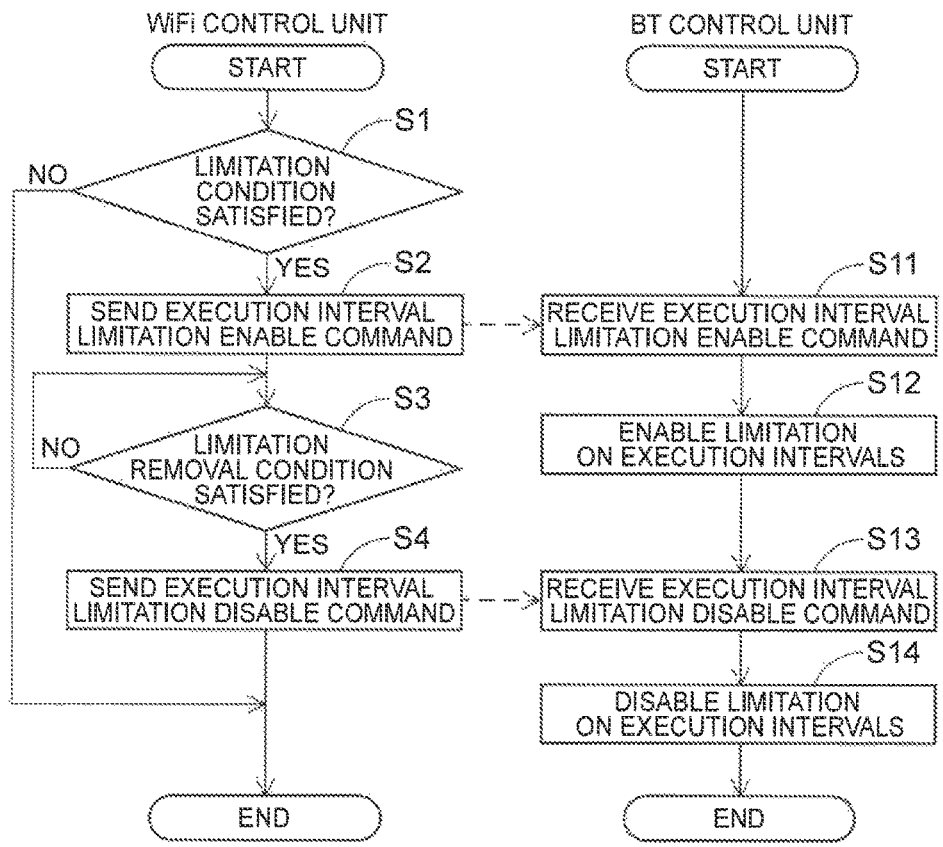
FIG. 4 is a flowchart of a wireless communication setting program according to the embodiment.
Figure 7:
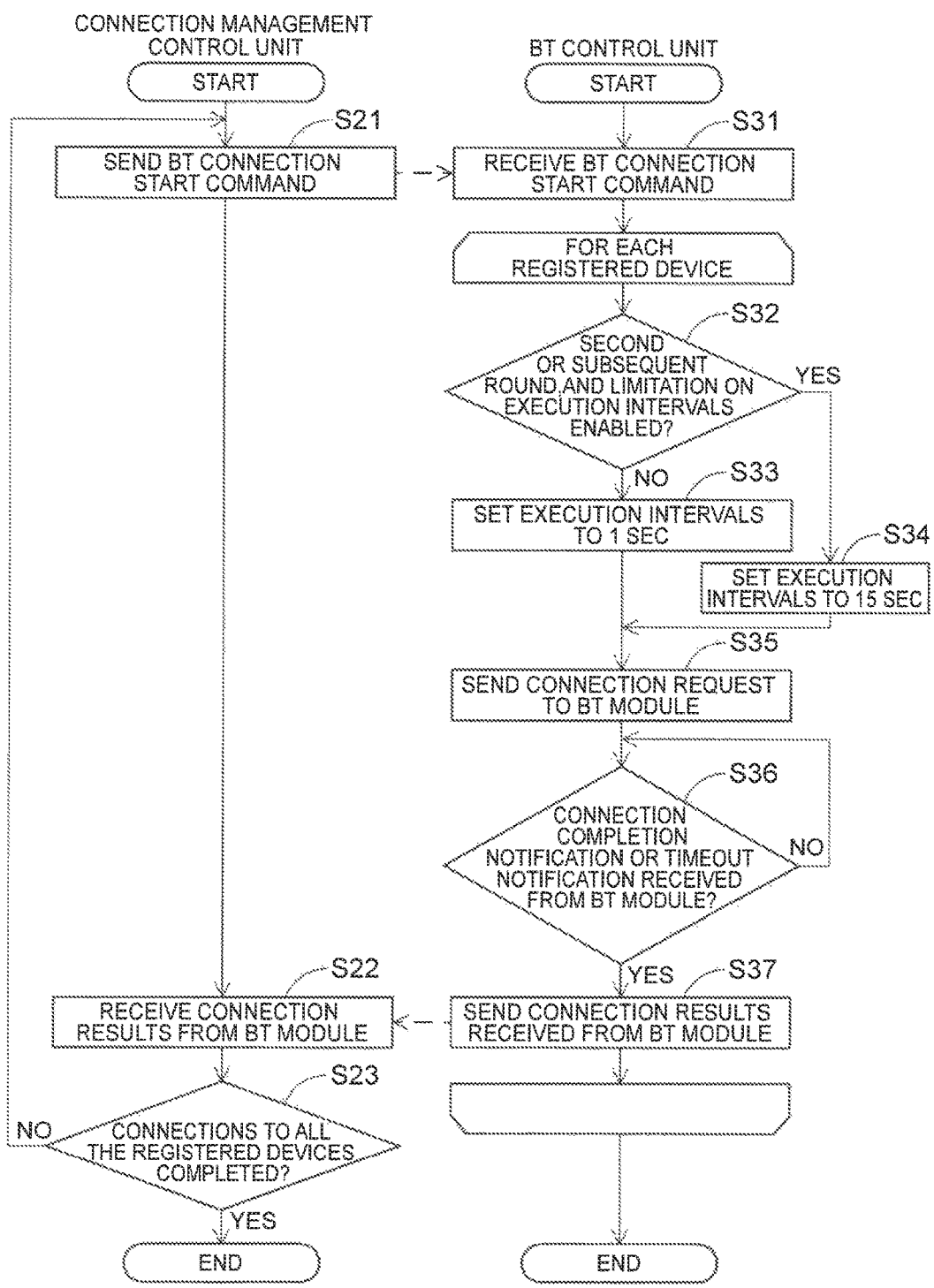
FIG. 7 is a flowchart of a BT device search program according to the embodiment.

The wireless communication setting program that is executed by the navigation device 1 having the above configuration will be described based on FIG. 4, FIG. 4 is a flowchart of the wireless communication setting program according to the present embodiment. The wireless communication setting program is a program that is executed after an ACC power is turned on, namely after a power source of the navigation device 1 is turned on, to perform setting regarding search processing of searching for each target device 4 registered in advance for BT connection. The program shown in the flowcharts of FIGS. 4 and 7 is stored in advance in the RAM, the ROM, etc. of the navigation device 1 and is executed by the control units 16 to 18.

First, the wireless communication setting program that is executed by the WIFi control unit 17 will be described, in step (hereinafter abbreviated as S) 1, the WiFi control unit 17 determines if a condition for limiting the execution intervals of processing (hereinafter referred to as the "search processing") of searching via BT for the target devices 4 registered in advance in the navigation device 1 for BT connection (hereinafter referred to as the "registered devices") is satisfied.

Figure 5:
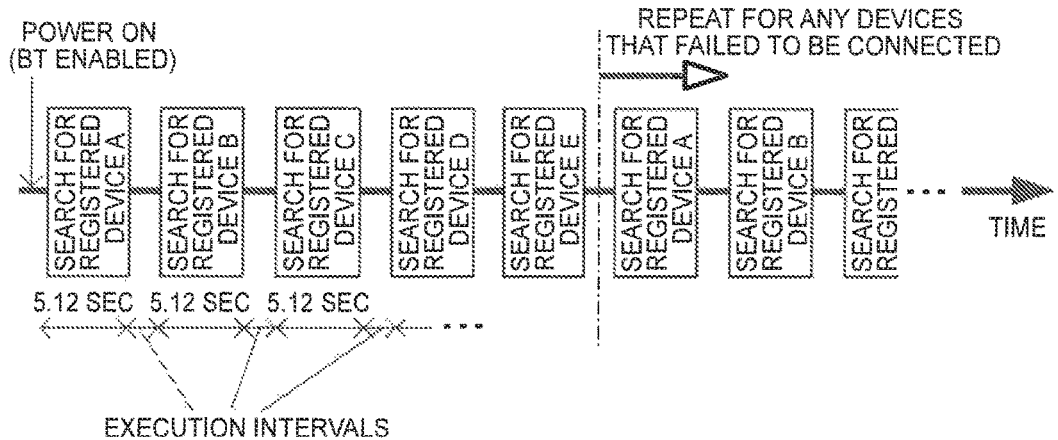
FIG. 5 is a diagram illustrating processing of searching for a registered device via BT.

In this example, when the power supply of the navigation device 1 is turned on (or the BT communication function is enabled), BT repeatedly executes the processing of searching for the registered devices at predetermined execution intervals in order to connect to each registered device, as described above. A plurality of (e.g. up to 10) target devices 4 can be set as the registered devices. FIG. 5 shows an example in which the power supply of the navigation device 1 is turned on (the BT communication function is enabled) with five target devices 4 being registered as registered devices A to E. As shown in FIG. 5, the navigation device 1 first executes search processing of searching for the registered device A in order to connect to the registered device A. The navigation device 1 executes the search processing of searching for the registered device for up to 5.12 seconds until it can connect to the intended device. After the predetermined execution interval, the navigation device 1 executes search processing of searching for the registered device B in order to connect to the registered device B. The navigation device 1 similarly executes search processing of searching for the registered devices C to E at the above execution intervals. After executing the search processing for searching for all of the registered devices A to E, the navigation device 1 similarly executes at the above execution intervals search processing of searching for any registered devices that failed to be connected.

In the present embodiment, the execution intervals of the search processing are initially set to one second, which is a reference interval. However, if it is determined in S1 that the condition for limiting the execution intervals of the search processing of searching for the registered devices is satisfied, the execution intervals of the search processing, especially for the second and subsequent rounds, are set to a value larger than the reference interval (specifically, 15 seconds) (S34 in FIG. 7).

The condition for limiting the execution intervals of the search processing of searching for the registered devices, which is determined in S1, is during at least a part of a period during which Wi-Fi communication is being performed or Wi-Fi communication is enabled. FIG. 6 is a table showing a specific example of the condition for limiting the execution intervals of the search processing for searching for the registered devices, which is determined in S1. Particularly in the present embodiment, the condition for limiting the execution intervals of the search processing for searching for the registered devices will be described with respect to three patterns, namely Examples 1 to 3. The navigation device 1 sets one of Examples 1 to 3 as the condition. The navigation device 1 may be configured so that one of Examples 1 to 3 can be selected based on user's operation.

First, in Example 1, the navigation device 1 basically limits the execution intervals of the search processing of searching for the registered devices while the Wi-Fi communication function is enabled. Specifically, if any of the following conditions (A) to (F) is satisfied, it is determined that the execution intervals of the search processing should be limited.

(A) The Wi-Fi communication function is enabled, but no processing for starting a connection is being performed, and no connection is being established. The Wi-Fi communication function can be enabled and disabled by operation on a communication settings screen of the navigation device 1 or operation of a hard key provided on a housing of the navigation device 1.

(B) Connection processing for starting a Wi-Fi connection is being automatically performed without user's operation.

(C) The list of access points for connection is being obtained via Wi-Fi.

(D) Connection processing for starting a Wi-Fi connection is being performed based on user's operation such as an operation of selecting an access point from the list of access points obtained in (C).

(E) The navigation device 1 is being actually connected via Wi-Fi to the target devices 4 (access points).

(F) Processing of changing an access point for connection (roaming) is being performed via Wi-Fi.

In Example 2, the navigation device I limits the execution intervals of the search processing of searching for the registered devices only when Wi-Fi communication is being actually performed. Specifically, if the condition (E) is satisfied, it is determined that the execution Intervals of the search processing should be limited.

In Example 3, the navigation device 1 limits the execution intervals of the search processing of searching for the registered devices only when the navigation device 1 is preparing for a Wi-Fi connection and when a Wi-Fi connection is being established in the case where a Wi-Fi connection has been started based on user's operation. Specifically, if any of the conditions (C) to (E) is satisfied, it is determined that the execution intervals of the search processing should be limited.

Example 1 is advantageous in that Wi-Fi communication is most easily performed, but is disadvantageous in that BT connections to the registered devices are delayed because, as long as the Wi-Fi communication function is enabled, the execution intervals of the search processing of searching for the registered devices are limited even if no Wi-Fi connection is being established. Example 2 is advantageous in that BT connections to the registered devices can be completed fastest. However, the execution intervals of the search processing of searching for the registered devices are limited only when Wi-Fi communication is being actually performed. For example, Example 2 is therefore disadvantageous in that it takes more time to start a Wi-Fi connection (i.e., it takes more time to prepare for a Wi-Fi connection) in the case where the user desires a Wi-Fi connection. Example 3 is a compromise between Examples 1 and 2, and is advantageous in that it takes less time to start a Wi-Fi connection in the case where a Wi-Fi connection is started based on user's intension.

If it is determined in S1 that the condition for limiting the execution intervals of the search processing of searching for the registered devices is satisfied (S1: YES), the program proceeds to S2. If it is determined in S1 that the condition for limiting the execution intervals of the search processing of searching for the registered devices is not satisfied (S1: NO), if is acknowledged that there is no need to change the execution intervals of the search processing from the reference interval, and the wireless communication setting program is terminated.

In S2, the WiFi control unit 17 sends to the BT control unit 16 a command signal to limit the execution intervals of the search processing of searching for the registered device (execution interval limitation enable command), The program then proceeds to S3. In response to the execution Interval limitation enable command, the BT control unit 16 enables the limitation on the execution intervals of the search processing of searching for the registered devices as described below. As a result, in the BT module 19, the execution intervals of the search processing are changed to a value (e.g., 15 seconds) larger than the reference interval.

Subsequently, the WiFi control unit 17 determines in S3 if the condition for removing the limitation on the execution intervals of the search processing of searching for the registered devices is satisfied.

The condition for removing the limitation on the execution intervals of the search processing of searching for the registered devices corresponds to the determination criterion in S1, namely corresponds to the condition for limiting the execution intervals of the search processing of searching for the registered devices. That is, the condition for removing the limitation on the execution intervals of the search processing of searching for the registered devices is that, the determination criterion in S1, namely the condition for limiting the execution intervals of the search processing of searching for the registered devices, is no longer satisfied.

For example, in the case where Example 1 shown in FIG 6 is used as the condition for limiting the execution intervals of the search processing of searching for the registered devices, it Is determined that the limitation on the execution intervals of the search processing of searching for the registered devices should be removed, If the condition other than the above conditions (A) to (F), namely the condition "(G) the Wi-Fi communication function of the navigation device 1 is disabled," is satisfied, In the case where Example 2 is used as the condition for limiting the execution intervals of the search processing of searching for the registered devices, it is determined that the limitation on the execution intervals of the search processing of searching for the registered devices should be removed, if any of the above conditions (A) to (D), (F), and "(G) the Wi-Fi communication function of the navigation device 1 is disabled" is satisfied.

In the case where Example 3 is used as the condition for limiting the execution intervals of the search processing of searching for the registered devices, it is determined that the limitation on the execution intervals of the search processing of searching for the registered devices should be removed, if any of the above conditions (A), (B), (F), and "(G) the Wi-Fi communication function of the navigation device 1 is disabled" is satisfied.

If it is determined in S3 that the condition for removing the limitation on the execution intervals of the search processing via BT is satisfied (S3: YES), the program proceeds to S4, If it is determined in S3 that the condition for removing the limitation on the execution intervals of the search processing via BT Is not satisfied (S3: NO), the program waits until the condition for removing the limitation on the execution intervals of the search processing via BT is satisfied.

In S4, the WiFi control unit 17 sends to the BT control unit 16 a command signal to remove the limitation on the execution intervals of the search processing of searching for the registered devices (execution interval limitation disable command). In response to the execution interval limitation disable command, the BT control unit 16 disables (removes) the limitation on the execution intervals of the search processing of searching for the registered devices as described below. As a result, in the BT module 19, the execution intervals of the search processing are changed back to the reference interval (e.g., 1 second).

The wireless communication setting program that is executed by the BT control unit 16 will be described below, First, in S11, the BT control unit 16 receives the execution interval limitation enable command from the WiFi control unit 17. The execution interval limitation enable command is a command signal to limit the execution intervals of the search processing of searching for the registered devices as described above.

Next, in response to the execution interval limitation enable command, the BT control unit 16 enables the limitation on the execution intervals of the search processing of searching for the registered devices in S12. For example, whether the limitation on the execution intervals of the search processing has been enabled or disabled is stored by a flag stored in a memory. If the limitation on the execution intervals of the search processing of searching for the registered devices has been enabled, the execution intervals of the search processing, especially for the second and subsequent rounds, are changed to a value particularly larger than the reference interval (S34). Specifically, the execution intervals are changed to 15 seconds.

In S13, the BT control unit 16 receives the execution interval limitation disable command from the WiFi control unit 17. The execution interval limitation disable command is a command signal to remove the limitation on the execution intervals of the search processing of searching for the registered devices as described above.

In response to the execution interval limitation disable command, the BT control unit 16 disables (removes) the limitation on the execution intervals of the search processing of searching for the registered devices in S14. With the limitation on the execution intervals of the search processing of searching for the registered devices being disabled, the search processing is executed at the reference intervals even in the second and subsequent rounds, as described below (S33).

The BT device search program that is executed in the navigation device 1 will be described based on FIG. 7. FIG. 7 is a flowchart of the BT device search program according to the present embodiment. The BT device search program is a program that is executed after the ACC power is turned on, namely after the power source of the navigation device 1 is turned on, to search for the target devices 4 for BT connection.

First, the BT device search program that is executed in the connection management control unit 18 will be described. In S21, the connection management control unit 18 sends to the BT control unit 16 a command signal to start the search processing of searching for the registering device (BT connection start command). The program then proceeds to S22. In response to the BT connection start command, the BT control unit 16 starts the search processing of searching for the registered device by using the BT module 19 as described below. The processing of S21 may be executed after the power supply of the navigation device 1 is turned on and the BT communication function is enabled (e.g., the BT communication function can be enabled and disabled by operation on the communication settings screen of the navigation device 1 or operation of a hard key provided on the housing of the navigation device 1).

Next, in S22, the connection management control unit 18 receives information on the results of connection to the registration device from the BT control unit 16. The information on the connection results received in S22 is information on each of the registered devices registered as target devices for BT connection in the navigation device 1 about whether a BT connection has been completed or timeout has occurred due to failure to connect within 5.12 seconds.

Based on the information received from the BT control unit 16 in S22. the connection management control unit 18 then determines in S23 if a BT connection has been completed for all of the registered devices registered as target devices for BT connection in the navigation device 1.

If it is determined that a BT connection has been completed for all of the registered devices registered as target devices for BT connection in the navigation device 1 (S23: YES), the BT device search program is terminated. If it is determined that a BT connection has not been completed for all of the registered devices registered as target devices for BT connection in the navigation device 1 (S23: NO), the program returns to S21, and the search processing of searching for the registered device continues to be executed.

The BT device search program that is executed by the BT control unit 16 will be described below.

First, in S31, the BT control unit 16 receives the BT connection start command from the connection management control unit 18. The BT connection start command is a command signal to start the search processing of searching for the registered device as described above.

In response to the BT connection start command, the BT control unit 16 performs the processing of S32 and the subsequent steps for all of the registered devices registered as target devices for BT connection in the navigation device 1, and then terminates the BT device search program. The registered devices that are registered as target devices for BT connection in the navigation device 1 include a mobile information terminal (mobile phone, smartphone, tablet), a portable audio device, etc. which are possessed by an occupant (user) of the vehicle 3, and are registered by performing a predetermined registration operation In advance in the navigation device 1.

First, in S32, the BT control unit 16 determines if the search processing of searching for the registered device is in the second or subsequent round and the limitation on the execution intervals of the search processing of searching for the registered devices has been enabled. In the navigation device 1 according to the present embodiment, after the search processing of searching for all of the registered devices are executed as shown in FIG. 5, the search processing of searching for the registered device is similarly executed again for any registered devices that failed to be connected. That is, in the first round, the search processing is executed for all of the registered devices, and in the second and subsequent rounds, the search processing is executed only for any registered devices that have failed to be connected so far. The limitation on the execution intervals of the search processing of searching for the registered devices is enabled or disabled in the wireless communication setting program described above (FIG. 4) (S12, S14).

If it is determined that the search processing of searching for the registered device is in the second or subsequent round and the limitation on the execution intervals of the search processing of searching for the registered devices has been enabled (S32: YES), the program proceeds to S34. If it is determined that the search processing of searching for the registered device is in the first round or if it is determined that the search processing of searching for the registered device is in the second or subsequent round and the limitation on the execution intervals of the search processing of searching for the registered devices has not been enabled (S32: NO), the program proceeds to S33.

In S33, the BT control unit 16 sets the execution intervals of the search processing for searching for the registered devices to the reference interval, namely one second.

In S34, the BT control unit 16 sets the execution intervals of the search processing for searching for the registered devices to a value larger than the reference interval, namely 15 seconds.

Figure 8:
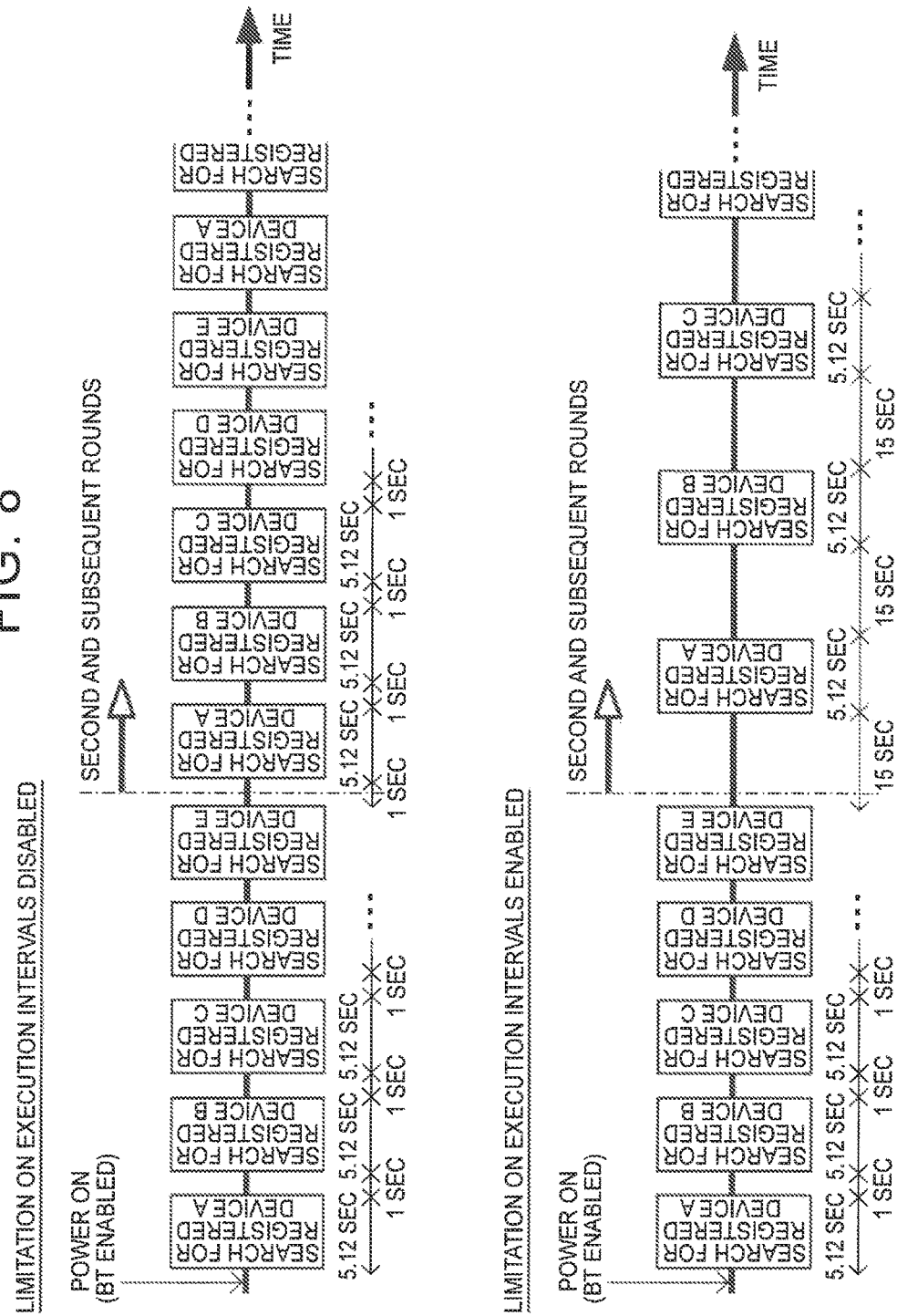
FIG. 8 is a diagram illustrating how the execution intervals of the processing of searching for the registered devices via BT are changed.
Figure 9:
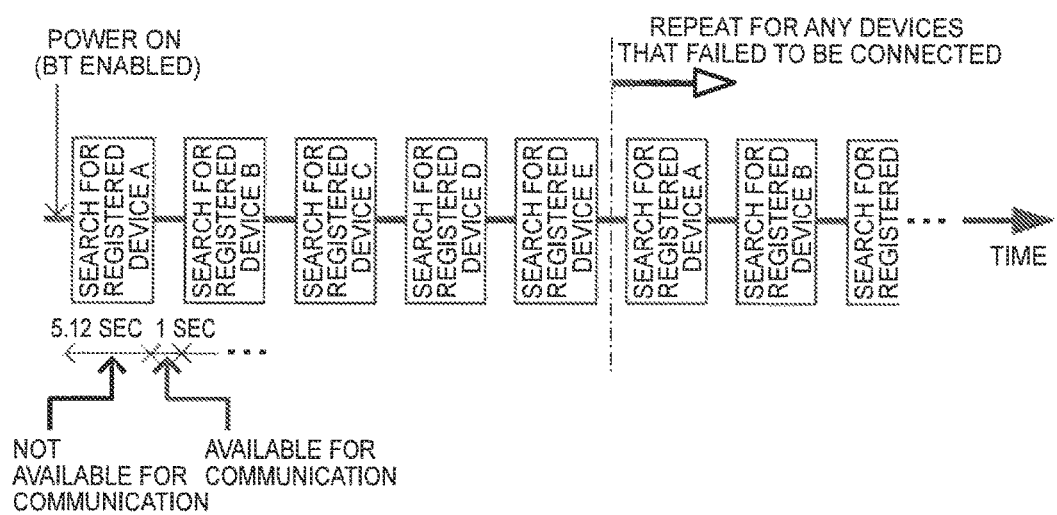
FIG. 9 is a diagram illustrating problems of related art.

As a result, as shown in FIG. 8, with the limitation on the execution intervals of the search processing of searching for the registered devices not being enabled, for example, with the Wi-Fi communication function of the navigation device 1 being disabled, the search processing of searching for the registered device is executed at the execution intervals of 1 second both in the first round and in the second and subsequent rounds. However, with the limitation on the execution intervals of the search processing of searching for the registered devices being enabled, for example, with the navigation device 1 being connected via Wi-Fi to the target devices 4 (access points), the search processing of searching for the registered device is executed at the execution intervals of 1 second in the first round, but Is executed at the execution intervals of 15 seconds in the second and subsequent rounds. This can prevent problems with Wi-Fi communication such as failure to establish a connection at a required timing or very slow communication and interrupted communication even if a connection can be established, while ensuring opportunities for BT connection.

In S35, the BT control unit 16 then sends a request for connection to the intended registered device to the BT module 19. In response to the connection request, the BT module 19 executes the search processing in order to establish a BT connection to the intended registered device.

Subsequently, in S36, the BT control unit 16 determines if a connection completion notification, which is a notification of completion of connection to the intended registered device, or a timeout notification, which is a notification of failure to connect to the intended registered device within the time limit (5.12 seconds), has been received from the BT module 19.

If it is determined that either the connection completion notification or the timeout notification has been received from the BT module 19 (S36: YES), the BT control unit 16 sends the determination result to the connection management control unit 18 (S37). If it is determined that neither the connection completion notification nor the timeout notification has been received from the BT module 19 (S36: NO), the BT control unit 16 waits until either the connection completion notification or the timeout notification is received.

After performing the processing of S32 to S37 for all of the registered devices registered as target devices for BT connection in the navigation device 1, the BT control unit 16 terminates the BT device research program.

As described in detail above, in the case where the navigation device 1 according to the present embodiment performs communications in the BT wireless communication mode in which the navigation device 1 repeatedly performs the processing of searching for the target devices 4 at predetermined intervals in order to connect to the registered target devices 4 and in the Wi-Fi wireless communication mode via the single antenna 21, the navigation device 1 changes the execution intervals of searching for the registered target devices 4 via BT to a value larger than the reference interval (S34) during at least a part of a period during which Wi-Fi communication is being performed or Wi-Fi communication is enabled. Since the execution intervals of searching for the registered target devices 4 via BT are changed according to the Wi-Fi communication status, the antenna 21 can be prevented from being occupied by BT. This eliminates problems with Wi-Fi communication such as failure to establish a connection at a required timing or very slow communication and interrupted communication even if a connection can be established. That is, even when communications In a plurality of kinds of wireless communication modes are performed via a single antenna, the communications in these wireless communication modes can coexist and the communications can he appropriately performed.

It should he understood that the above embodiment is exemplary, and various improvements and modifications can be made without departing from the spirit and scope of the underlying principles.

For example, in the present embodiment, the WiFi control unit 17 performs S1 to S4 of the wireless communication setting program (FIG. 4), the connection management control unit 18 performs S21 to S23 of the BT device search program (FIG. 7), and the BT control unit 16 performs S11 to S14 of the wireless communication setting program (FIG. 4) and S31 to S37 of the BT device search program (FIG. 7). However, the unit that performs each step may be switched as appropriate among the control units. The navigation control unit 13 may execute the steps.

In the present embodiment, the execution intervals of searching for the registered devices are changed to 15 seconds that is longer than the reference interval, in the case where the search processing of searching for the registered device is in the second or subsequent round and the limitation on the execution intervals of the search processing of searching for the registered devices has been enabled. However, the execution intervals may be changed to a value other than 15 seconds (e.g., 10 seconds or 20 seconds) as long as the value is larger than the reference interval. The reference interval may be other than 1 second.

In the present embodiment, Examples 1 to 3 In FIG. 6 are show as the conditions for limiting the execution intervals of the search processing of searching for the registration devices. However, conditions other than the Examples 1 to 3 may be used. For example, the execution intervals of the search processing may be limited when any of the conditions (C) to (F) is satisfied.

In the present embodiment, the navigation device 1 is shown as an example of the wireless communication device that performs communications in a plurality of wireless communication modes via a single antenna. However, the above-described principles are also applicable to a device other than the navigation device 1 which performs communications in a plurality of wireless communication modes via a single antenna. Examples of such a device include an on-board audio device, a personal computer, a smartphone, a tablet, etc.

Although the embodiment of the wireless communication device is described above, the wireless communication device may have the following configurations. In these cases, the wireless communication device has the following advantageous effects.

For example, the first configuration is as follows.

A wireless communication device (1) performs, via a single antenna, communications in a first wireless communication mode in which the wireless communication device repeatedly executes processing of searching for other registered devices (4) at a predetermined execution interval in order to connect to these other registered devices and in a second wireless communication mode according to a communication standard other than the first wireless communication mode. The execution interval in the first wireless communication mode is set to a reference interval. The wireless communication device includes: execution interval changing means (16 to 18) for changing the execution interval in the first wireless communication mode to a value larger than the reference interval during at least a part of a period during which communication in the second wireless communication mode is being performed or communication in the second wireless communication mode is enabled.

According to the wireless communication device having the above configuration, the execution interval of the search processing of searching for those other devices in the first wireless communication mode is changed according to the communication status in the second wireless communication mode. The antenna can thus be prevented from being occupied by the first wireless communication mode. This eliminates problems with communication in the second wireless communication mode such as failure to establish a connection at a required timing or very slow communication and interrupted communication even if a connection can be established. That is, even when communications in a plurality of kinds of wireless communication modes are performed via a single antenna, the communications In these wireless communication modes can coexist and the communications can be appropriately performed.

For example, the second configuration is as follows.

The execution interval changing means (16 to 18) changes the execution interval to the value larger than the reference interval after a round of the processing for searching for those other devices (4) in the first wireless communication mode is performed at the reference interval for all of those other registered devices.

According to the wireless communication device having the above configuration, even when the execution interval of searching for those other devices in the first wireless communication mode Is changed to a longer interval, the first round of the search processing is executed at the reference interval. This can prevent an increase in time required to complete connections with those other devices in the first wireless communication mode.

For example, the third configuration is as follows.

The first wireless communication mode is a wireless communication mode in which direct communication is performed without via an access point, and the second wireless communication mode is a wireless communication mode in which communication is performed via the access point. The "access point" is also called a base unit, a base station, or a station.

According to the wireless communication device having the above configuration, even when communications in a plurality of kinds of wireless communication modes according to totally different communication standards such as Wi-Fi and Bluetooth are performed via a single antenna, the communications in these wireless communication modes can coexist and the communications can be appropriately performed.

For example, the fourth configuration is as follows.

The execution interval changing means (16 to 18) changes the execution interval in the first wireless communication mode to the value larger than the reference interval while a connection to the access point is being established in the second wireless communication mode.

According to the wireless communication device having the above configuration, the execution interval of the processing of searching for those other devices in the first wireless communication mode is changed to the value larger than the reference interval while communication is actually being performed in the second wireless communication mode. This eliminates problems with communication in the second wireless communication mode such as very slow communication and interrupted communication.

For example, the fifth configuration is as follows.

The execution interval changing means (16 to 18) changes the execution interval in the first wireless communication mode to the value larger than the reference interval while processing for starting a connection to the access point is being performed in the second wireless communication mode.

According to the wireless communication device having the above configuration, the execution interval of searching for those other devices in the first wireless communication mode is changed to the value larger than the reference interval while preparation for a connection in the second wireless communication mode is being done. This eliminates problems with communication in the second wireless communication mode such as failure to establish a connection at a required timing and an increase in time required to actually establish a connection after connection processing is started.

For example, the sixth configuration is as follows.

The execution interval changing means (16 to 18) changes the execution interval in the first wireless communication mode to the value larger than the reference interval while the processing for starting a connection to the access point is being performed in the second wireless communication mode based on user's operation.

According to the wireless communication device having the above configuration, the execution interval of searching for those other devices in the first wireless communication mode is changed to the value larger than the reference interval while preparation for a connection in the second wireless communication mode, which has been started especially based on user's operation, is being done. This eliminates problems with communication in the second wireless communication mode such as failure to establish a connection at a timing desired by the user and an increase in time required to actually establish a connection after an operation for establishing a connection is started by the user.

For example, the seventh configuration is as follows.

The execution interval changing means (16 to 18) changes the execution interval in the first wireless communication mode to the value larger than the reference Interval while a list of access points for connection is being obtained in the second wireless communication mode based on user's operation.

According to the wireless communication device having the above configuration, the execution interval of searching for those other devices in the first wireless communication mode is changed to the value larger than the reference interval while the processing of obtaining a list of access points, which has been started especially based on user's operation, is being performed. This eliminates problems with communication in the second wireless communication mode such as failure to establish a connection at a timing desired by the user and an increase in time required to actually establish a connection after an operation for establishing a connection is started by the user.

For example, the eighth configuration is as follows.

The execution interval changing means (16 to 18) changes the execution interval in the first wireless communication mode to the value larger than the reference interval while processing of changing the access point for connection is being performed in the second wireless communication mode.

According to the wireless communication device having the above configuration, the execution interval of searching for those other devices in the first wireless communication mode is changed to the value larger than the reference interval while the access point in the second wireless communication mode is being changed. This eliminates problems with communication in the second wireless communication mode such as an increase in time required in changing the access point namely, time period during which communication in the second wireless communication mode is not available due to changing of the access point.

The invention claimed is:

1. A wireless communication device comprising:
a processor programed to
perform, via a single antenna:
communications in a first wireless communication mode in which the processor repeatedly executes processing of searching for other registered devices at a predetermined execution interval in order to connect to these other devices, the execution interval being set to a reference interval; and
communications in a second wireless communication mode according to a communication standard other than the first wireless communication mode; and
change the execution interval in the first wireless communication mode to a value larger than the reference interval:
during at least a part of a period during which communication in the second wireless communication mode is being performed or communication in the second wireless communication mode is enabled; and
after a round of the processing of searching for those other devices in the first wireless communication mode is performed at the reference interval for all of those other registered devices.

2. The wireless communication device according to claim 1, wherein:
the first wireless communication mode is a wireless communication mode in which direct communication is performed without via an access point, and
the second wireless communication mode is a wireless communication mode in which communication is performed via the access point.

3. The wireless communication device according to claim 2, wherein the processor is programmed to:
change the execution interval in the first wireless communication mode to the value larger than the reference interval while a connection to the access point is being established in the second wireless communication mode.

4. The wireless communication device according to claim 2, wherein the processor is programmed to:
change the execution interval in the first wireless communication mode to the value larger than the reference interval while processing for starting a connection to the access point is being performed in the second wireless communication mode.

5. The wireless communication device according to claim 4, wherein the processor is programmed to:
change the execution interval in the first wireless communication mode to the value larger than the reference interval while the processing for starting a connection to the access point is being performed in the second wireless communication mode based on user's operation.

6. The wireless communication device according to claim 5, wherein the processor is programmed to:
change the execution interval in the first wireless communication mode to the value larger than the reference interval while a list of access points for connection is being obtained in the second wireless communication mode based on user's operation.

7. The wireless communication device according to claim 2, wherein the processor is programmed to:
change the execution interval in the first wireless communication mode to the value larger than the reference interval while processing of changing the access point for connection is being performed in the second wireless communication mode.

8. A wireless communication method of performing wireless communications by a wireless communication device, the method comprising:
performing, via a single antenna:
communications in a first wireless communication mode in which a processor in the wireless communication device repeatedly executes processing of searching for other registered devices at a predetermined execution interval in order to connect to these other devices, the execution interval being set to a reference interval; and
communications in a second wireless communication mode according to a communication standard other than the first wireless communication mode; and
changing the execution interval in the first wireless communication mode to a value larger than the reference interval:
during at least a part of a period during which communication in the second wireless communication mode is being performed or communication in the second wireless communication mode is enabled; and
after a round of the processing of searching for those other devices in the first wireless communication mode is performed at the reference interval for all of those other registered devices.

9. A computer-readable storage medium storing a computer-executable program that causes a wireless communication device to perform the following functions:
performing, via a single antenna:
communications in a first wireless communication mode in which the wireless communication device repeatedly executes processing of searching for other registered devices at a predetermined execution interval in order to connect to these other devices, the execution interval being set to a reference interval; and
communications in a second wireless communication mode according to a communication standard other than the first wireless communication mode; and
changing the execution interval in the first wireless communication mode to a value larger than the reference changing the execution interval in the first wireless communication mode to a value larger than the reference interval:
during at least a part of a period during which communication in the second wireless communication mode is being performed or communication in the second wireless communication mode is enabled; and
after a round of the processing of searching for those other devices in the first wireless communication mode is performed at the reference interval for all of those other registered devices.

* * * * *